Aug. 5, 1930.  C. H. ARMSTRONG ET AL  1,772,199
VALVE
Filed Oct. 22, 1928
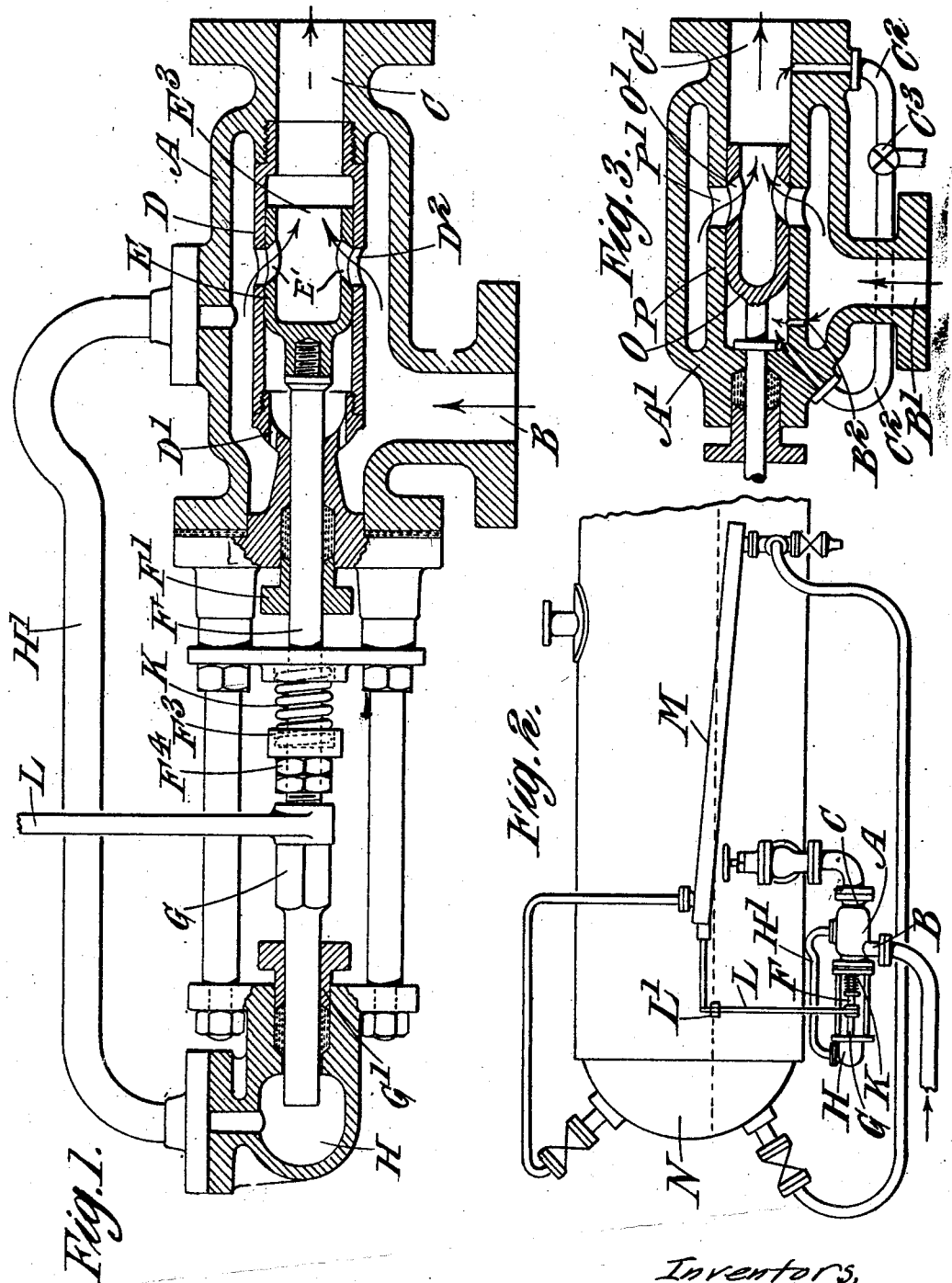

Patented Aug. 5, 1930

1,772,199

UNITED STATES PATENT OFFICE

CLIFFORD HARRY ARMSTRONG AND JAMES GORDON, OF LONDON, ENGLAND, ASSIGNORS TO JAMES GORDON & COMPANY LIMITED, OF LONDON, ENGLAND, A COMPANY OF GREAT BRITAIN

VALVE

Application filed October 22, 1928, Serial No. 314,259, and in Great Britain October 28, 1927.

This invention relates to valves and in particular to those, usually automatically operated, used to control the flow of fluids in accordance with changes in the temperature, pressure or other properties of the fluid.

Various proposals have hitherto been made to provide a satisfactory valve of the above general type, and although balanced or substantially balanced valves both of the lift and rotary kind have been employed, the fluid had direct access to the valve seatings, and the valves themselves in practice failed either to open or close in response to the movements of their controlling member, or in accordance with the changes in the properties of the fluid. The object of this invention is to provide an improved valve of the rotary type which will not be open to these disadvantages.

According to this invention the valve comprises a casing or body having ports therein controlled by a movable valve member which is normally rotated to control the ports and is also adapted to move longitudinally so as to vary the effective area of the ports in accordance with changes in the pressure of the fluid passing through the valve. Preferably, the movable valve member is in the form of a hollow ported piston adapted to rotate in a housing arranged at right angles to the direction in which the fluid enters the valve casing and in alignment with the passage through which the outlet takes place. The movable valve member carries a spindle which is rotated from outside the casing in any known manner and the closed end of the movable valve member, and, if desired, the end of its spindle also, is normally subjected to the inlet pressure so that there is normally a pressure tending to close the valve or reduce the size of the ports owing to the piston being longitudinally movable as well as capable of rotation within its housing. In such cases a spring, diaphragm, or other thrust member, preferably adjustable from outside the casing, is provided to balance or partially balance the normal inlet pressure.

In an alternative arrangement instead of the full inlet pressure having access to the closed end of the movable valve member, the latter is mounted within a substantially closed cylindrical housing both ends of which are in communication with the outlet pressure, that end of the housing, however, remote from the outlet being also in communication, by means of a small leak hole, with the inlet pressure so that there is a tendency for the valve to move longitudinally so as to reduce the effective area of the ports. In either construction the valve may be so arranged that excessive outlet pressure causes the valve to move longitudinally so as to act as a check or stop valve.

In the accompanying drawings which show two constructions of valve according to this invention designed for use with feed water regulators:—

Figure 1 is a longitudinal section through one form of water-regulating valve,

Figure 2 is a diagram showing a steam generator to which the valve illustrated in Figure 1 is applied, and Figure 3 is a longitudinal section of a modified form of valve.

In the construction illustrated in Figure 1 the valve comprises a casing A having an inlet port B at right angles to the outlet port C. Mounted within the casing is a cylindrical housing D having perforations $D^1$ in its head and its opposite or open end is in alignment with the outlet port C. Rotatably mounted in the housing D is a hollow piston E, having ports $E^1$, which cooperate with ports $D^2$ in the housing, and an open end $E^3$. The closed end or head of the piston is connected to a spindle F which passes through an opening in the head of the housing and extends through a stuffing box $F^1$ in the valve casing. The exposed portion of the spindle has an extension G which passes through a stuffing box $G^1$ into a casing H connected by a pipe $H^1$ with the interior of the main casing A so that the end of the spindle-extension G is subjected to the same inlet pressure as the closed head of the piston E and this pressure tends to move the piston in a longitudinal direction so as to reduce the effective area of the ports $D^2$, $E^1$ through which the liquid passes to the outlet C.

To counteract this pressure a spring K is interposed between a collar $F^3$ on the spindle and the cover of the main casing A, and the pressure of this spring can be easily controlled by adjusting the nuts $F^4$.

In the example shown the piston valve E is rotated by a lever L connected through a universal joint $L^1$ to a known type of thermostat M in communication with the steam and water spaces of the boiler drum N so that when the temperature within the boiler rises, due to a fall in the water level, the piston valve E is rotated to admit more feed water. In addition, however, to this rotary motion, the valve according to this invention can move in a longitudinal direction in response to changes in the pressure at which the feed water is supplied through the inlet branch $A^1$, so that if this pressure rises, the piston will move towards the outlet port against the action of the spring K and thus reduce the effective area of the ports $E^1$.

If, on the other hand, the feed pump should fail, the outlet pressure acting on the piston E will cause this to move in the opposite direction to act as a check valve and totally close the ports $D^1$.

In the alternative construction of valve diagrammatically illustrated in Figure 3, the casing $A^1$ is provided with an inlet port $B^1$ and outlet port $C^1$, but instead of the inlet pressure having access to the closed end of the movable piston O, this is mounted within a housing P which extends throughout the length of the casing and both ends of this housing are in communication with the outlet pressure by means of a suitable balancing tube or conduit $C^2$ preferably provided with a control cock indicated at $C^3$. The housing P is furnished with ports $P^1$ which cooperate with ports $O^1$ in the piston to allow fluid entering at $B^1$ to escape at $C^1$. The end of the housing P remote from the outlet port is placed in permanent communication with the inlet pressure by the provision of a small leak hole $B^2$ the bore of which is smaller than that of the tube $C^2$ so that there is a tendency for the piston to move longitudinally in a direction to close or reduce the effective size of the ports $O^1$.

In other respects the rotation of the piston O may be effected through mechanism similar to that already described, which in itself forms no part of the present invention. In both the above constructions, by arranging the inlet at right angles to the outlet and by placing the piston valve so that it moves parallel to the outflow, wear of the moving parts is considerably reduced and as a result the valve is more sensitive and can be more readily operated than in previous constructions, whatever the effective area of the outlet ports due to the longitudinal movement of the valve under varying pressures.

It is to be understood that the constructional details can be varied in accordance with the particular requirements the valve is to fulfill without departing from this invention.

What we claim as our invention and desire to secure by Letters Patent is:—

1. In a valve for controlling the flow of fluids, the combination of a valve body having an inlet port and an outlet port at right angles thereto, a fixed housing in the body open at one end in alignment with the outlet port of the valve body and provided with inlet ports at right angles to said open end, a ported piston rotatably mounted within said housing, a valve spindle secured to said piston extending outside the body, means on said spindle for rotating the valve to control the ports in the housing, a closed chamber into which the end of the spindle extends, a passage establishing communication between said chamber and the interior of the valve body, and a passage in the fixed housing through which the closed end of the piston is subjected to the pressure of the fluid, the valve and its spindle being thus balanced and longitudinally movable under variations in the pressure of the fluid to vary the effective area of the ports in the housing.

2. In a valve for controlling the flow of fluids, the combination of a valve body having an inlet port and an outlet port at right angles thereto, a fixed housing within the valve body having inlet ports at right angles to the outlet port, a hollow ported piston rotatably mounted within said housing said piston being also longitudinally movable under variations in the pressure of the fluid to vary the effective area of the ports it controls, a pressure-equalizing passage establishing communication between the two ends of the ported housing containing the movable piston, and a passage in the housing through which the closed end of the piston is in addition exposed to the inlet pressure of the fluid as set forth.

3. In a valve for controlling the flow of fluids, the combination of a valve body having inlet and outlet ports, a fixed housing within the valve body having inlet ports in its walls and open at one end to form an outlet port, a ported piston rotatably mounted within said housing, a valve spindle secured to said piston extending outside the body, means on said spindle for rotating the valve to control the ports in the housing, a closed chamber into which the end of the spindle extends, a passage establishing communication between said chamber, and the interior of the valve body, and a passage in the fixed housing through which the closed end of the piston is subjected to the pressure of the fluid, the valve and its spindle being thus balanced and longitudinally movable under variations in the pressure of the fluid to vary the effective area of the ports in the housing.

4. In a valve for controlling the flow of fluids, the combination of a valve body having inlet and outlet ports, a fixed housing within the valve body having inlet ports, a hollow ported piston rotatably mounted within said housing, said piston being also longitudinally movable under variations in the pressure of the fluid to vary the effective area of the ports it controls, a pressure-equalizing passage establishing communication between the two ends of the ported housing containing the movable piston, and a passage in the housing through which the closed end of the piston is in addition exposed to the inlet pressure of the fluid as set forth.

In testimony whereof we have signed our names to this specification.

CLIFFORD HARRY ARMSTRONG.
JAMES GORDON.